United States Patent
Chien et al.

(10) Patent No.: US 10,915,169 B2
(45) Date of Patent: Feb. 9, 2021

(54) CORRECTING METHOD AND DEVICE FOR EYE-TRACKING

(71) Applicant: National Taiwan University, Taipei (TW)

(72) Inventors: Shao-Yi Chien, Taipei (TW);
Chia-Yang Chang, Taipei (TW);
Shih-Yi Wu, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 16/299,012

(22) Filed: Mar. 11, 2019

(65) Prior Publication Data
US 2020/0167957 A1    May 28, 2020

(30) Foreign Application Priority Data

Nov. 28, 2018   (TW) ............................. 107142362 A

(51) Int. Cl.
*G06F 3/01*    (2006.01)
*G06T 7/80*    (2017.01)
*G06T 7/246*   (2017.01)

(52) U.S. Cl.
CPC .............. *G06F 3/013* (2013.01); *G06T 7/248* (2017.01); *G06T 7/80* (2017.01)

(58) Field of Classification Search
CPC ............ G06T 7/248; G06T 7/80; G06F 3/013
See application file for complete search history.

(56) References Cited

U.S. PATENT DOCUMENTS

| | | | |
|---|---|---|---|
| 2012/0154619 A1* | 6/2012 | Lee | G06K 9/228 348/222.1 |
| 2018/0335840 A1 | 11/2018 | Lin | |
| 2019/0324528 A1* | 10/2019 | Williams | G06K 9/00375 |

OTHER PUBLICATIONS

Office Action dated Jun. 28, 2019 in corresponding Taiwan Patent Application No. 107142362.

* cited by examiner

*Primary Examiner* — Lin Ye
*Assistant Examiner* — Chriss S Yoder, III
(74) *Attorney, Agent, or Firm* — Donald E. Stout; Stout, Uxa & Buyan, LLP

(57) ABSTRACT

Correction method and device for an eye-tracker are provided. A non-predetermined scene frame is provided and analyzed to obtain a salient feature information, which is in-turn used to correct an eye-tracking operation. The correction can be done at the initial or during the wearing of an eye-tracker.

13 Claims, 2 Drawing Sheets

CORRECTING METHOD AND DEVICE FOR EYE-TRACKING

CROSS-REFERENCE TO RELATED APPLICATIONS

The entire contents of Taiwan Patent Application No. 107142362, filed on Nov. 28, 2018, from which this application claims priority, are expressly incorporated herein by reference.

BACKGROUND OF THE INVENTION

1. Field of the Invention

The present invention relates to an operation method and device for eye-tracking, and more particularly relates to a correcting method and device for eye-tracking.

2. Description of Related Art

Eye-tracking is a technique for measuring an eye's movements relative to the head and eye's gazing directions. A general eye tracker includes gaze-sensing module for tracking eye's movements and gazing direction. A non-intrusively gaze-sensing module is typically equipped with an eye camera and a scene camera. The eye camera captures eye images of a wearer, and the scene camera captures the scene image viewed by the wearer. The eye camera is paced around the eye of the wearer to avoid obstructing the view of the wearer. This leads to the generation of errors, which needs to be corrected.

Taiwan Patent No. 1617948 discloses a correction module for eye tracking. The correction module comprises an image generator and a capturing controller. The image generator displays a picture with a cursor that shifts along a correction path for a user to gaze. As the cursor shifts, the capturing controller continuously captures images of the user's eye to record a plurality of user's gazing directions, which are then used to obtain a correction information coordinate sequence, and which in turn is used to correct the eye tracker. The above technique is applied to a head-free eye tracker. Typically a head-mounted eye tracker is corrected by using pre-determined markers or by using three-dimensional information of the eye.

SUMMARY OF THE INVENTION

The invention provides a correction method and device for eye-tracking, which can be used to perform an initial correction and dynamic corrections for the initial use and during the wearing of a head-mounted device, so as to eliminate an error caused by offset between an eye camera and the eye's position.

The invention provides a correction method and device for eye-tracking, which use a non-predetermined image or mark to correct an error caused by offset between an eye camera and the eye's position.

According to an aspect of this invention, a correction method is provided for eye-tracking and comprises the steps of: providing a scene frame; analyzing the scene frame to obtain a salient feature information of the scene frame; and correcting an eye-tracking operation based on the salient feature information.

In one embodiment, the scene frame is captured and provided by a scene camera.

In one embodiment, the scene frame is provided by a computer.

In one embodiment, the scene frame is captured and provided by a scene camera and the scene frame is further incorporated with one or more object images provided by a computer.

In one embodiment, the step of analyzing the scene frame comprises obtaining the salient feature information by a region of interest (ROI) method.

In one embodiment, the step of analyzing the scene frame comprises obtaining the salient feature information by a salient object detection method.

In one embodiment, the correction method further comprising a step of receiving an eye frame before the step of correcting the eye-tracking operation, and the step of correcting the eye-tracking operation is based on the eye frame and the salient feature information.

According to another aspect of this invention, a correction module is provided for eye-tracking and comprises a detecting unit and an operation unit. The detecting unit receives a scene frame. The operation unit analyzes the scene frame to obtain a salient feature information of the scene frame, and computes the salient feature information to obtain a correction data.

In one embodiment, the scene frame is captured and provided by a scene camera.

In one embodiment, the scene frame is an image frame of a video provided by a computer.

In one embodiment, the scene frame is captured and provided by a scene camera and the scene frame is further incorporated with one or more object images provided by a computer.

In one embodiment, the scene frame is analyzed to obtain the salient feature information by a region of interest (ROI) method.

In one embodiment, the scene frame is analyzed to obtain the salient feature information by a salient object detection method.

In one embodiment, the correction module further comprises an eye camera for capturing eye frames of a user, and wherein the operation unit analyzes the scene frame to obtain the salient feature information of the scene frame, receives an eye frame from the eye camera, and computes the salient feature information and the eye frame to obtain the correction data.

According to another aspect of this invention, an eye-tracking chip is provided with a correction module and an eye-tracking module. The correction module comprises a detecting unit and an operation unit. The detecting unit receives a scene frame. The operation unit analyzes the scene frame to obtain a salient feature information of the scene frame, and computes the salient feature information to obtain a correction data. The eye-tracking module corrects an eye-tracking operation according to the correction data.

DETAILED DESCRIPTION OF THE PREFERRED EMBODIMENT

Figure 1:
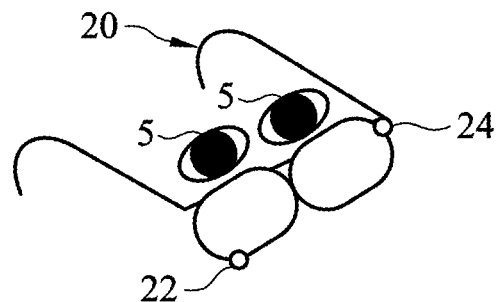
FIG. 1 is a perspective view of a wearable device to which the correction method of the present invention for eye-tracking is applied.

Embodiments of the invention are now described and illustrated in the accompanying drawings, instances of which are to be interpreted to be to scale in some implementations while in other implementations, for each instance, not. In certain aspects, use of like or the same reference designators in the drawings and description refers to the same, similar or analogous components and/or elements, while according to other implementations the same use should not. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components.

FIG. 1 is a perspective view of a wearable device to which the correction method of the present invention for eye-tracking is applied. The wearable device is an eye tracker 20 equipped with at least an eye camera 22 and a scene camera 24. In general, the eye tracker 20 is worn in front of the wearer's eyes 5, and there is a distance between the eye camera 22 and the wearer's an eye. The eye camera 22 captures the images of the eye and the captured images are referred to as "eye frames". The scene camera 24 captures images in front of the wearer and the captured images are referred to as "scene frames". It should be noted that, although the present embodiment is described with a natural scene, the present invention is not limited thereto and it may be a scene frame in a virtual reality (VR) or augmented reality (AR) system.

Figure 2:
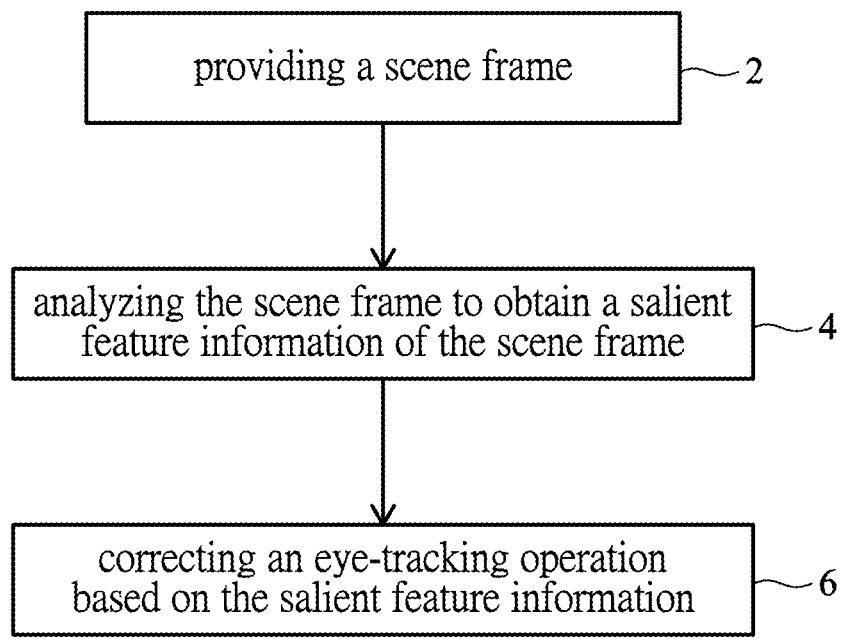
FIG. 2 is a flow chart of a correction method for eye tracking according to an embodiment of the present invention.

FIG. 2 is a schematic flow chart of a correction method for eye-tracking according to an embodiment of the present invention. Referring to FIG. 2, the correction method of the present invention first provides a scene frame in step 2. In the present invention, the scene frame refers to a picture seen by the user's eyes, such as an actual natural scene. In a virtual reality (VR) system, the picture seen by the eye is an image frame of a computer drawing or an interactive dynamic video, usually controlled by computer to project or output images and video for user to watch. In augmented reality (AR) system, the picture seen by the eyes refers to a nature scene. The nature scene, as shown in FIG. 1, is generally captured by the scene camera 24 in a range of fields of view (FOV), and the nature scene may include actual fixed or moving objects and may further combine with virtual objects. It will be appreciated that the scene frame as recited here is not a predetermined image or mark, e.g., a cross mark or the like, which is specifically designed for corrective use.

Figure 3:
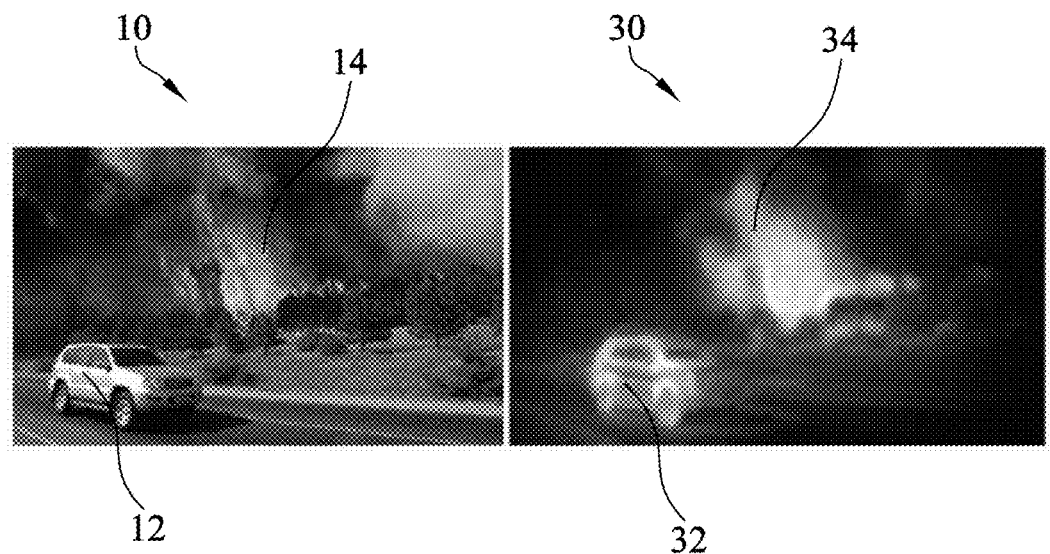
FIG. 3 shows a colored image with salient feature information of a correction method for eye-tracking according to an embodiment of the present invention.

FIG. 3 is a schematic diagram showing a salient feature information of the correction method for eye-tracking according to an embodiment of the present invention. Referring to FIGS. 1, 2 and 3, the scene frame is then analyzed to obtain a salient feature information of the scene frame in step 4. In the present invention, the salient feature information of the scene frame is analyzed by detecting the scene frame through the object detection methods, which may include but are not limited to, a region of interest (ROI) method or a salient object detection method. The salient feature information obtained by the region of interest (ROI) method or the salient object detection method is usually the object or position that the wearer is interested in, and is generally the point that the wearer is looking for. In the present invention, the analyzed salient feature information is used for correction. For example, if the user sees a vehicle 12 traveling through a vicinity of a fire scene 14, the scene frame 10 captured by the scene camera 24 may include the vehicle 12, the fire scene 14, and other backgrounds. A saliency map 30 including a vehicle saliency image 32 and a fire scene saliency image 34 is obtained by means of, e.g., the salient object detection method.

With continued reference to FIGS. 1-3, an eye-tracking operation is corrected based on the salient feature information of the scene frame (step 6). In the present invention, the salient feature information of the scene frame, i.e., the vehicle saliency image 32 and the fire scene saliency image 34 of the saliency map 30, are used as the correction data for the error analysis of the eye-tracking, and can be used as the only correction data to correct the eye-tracking operation. For example, if the eye-tracker 20 has not been used for a long time or is used for the first time and no correction has been done to the eye-tracker 20, the above-mentioned method may be applied to obtain the salient feature information of scene frame 10 and then the salient feature information is used to correct the eye-tracking operation of the eye-tracker 20.

Alternatively, in the case that the eye-tracker 20 has been corrected by correction data from an eye frame captured by the eye camera 22, the salient feature information of the scene frame 10 can combine with the correction data from the eye frame as the required correction data for the error analysis, and hence to correct the eye-tracking operation. Therefore, when the user wears the eye tracker 20, scene frames 10 are continuously captured by the scene camera 24. Any time the scene frame 10 seen by the wearer's eye and the eye frame captured by the eye camera 22 can be used to re-correct or correct the eye-tracker 20 in real time.

In contrast, conventional eye-tracker uses a pre-determined image, which is a deliberately designed image for correction. Compared with the pre-determined image, the present invention captures a scene frame by the scene camera 24 and analyzes its salient feature information of the region or object of interest by using the detection method, and then the salient feature information is used as the basis for error analysis, which is then used as a part or whole correction data for the eye-tracking operation. Accordingly, it is not necessary to store an image for correction in advance. On the other hand, because the correction of the present invention is done by the salient feature information of the scene frame captured by the scene camera, the eye tracker can be corrected at any time during the wearing, so that the accuracy of eye-tracking is continuously improved and optimized during the wearing. The re-correction can be done without need to take off and then re-wear the eye tracker.

Figure 4:
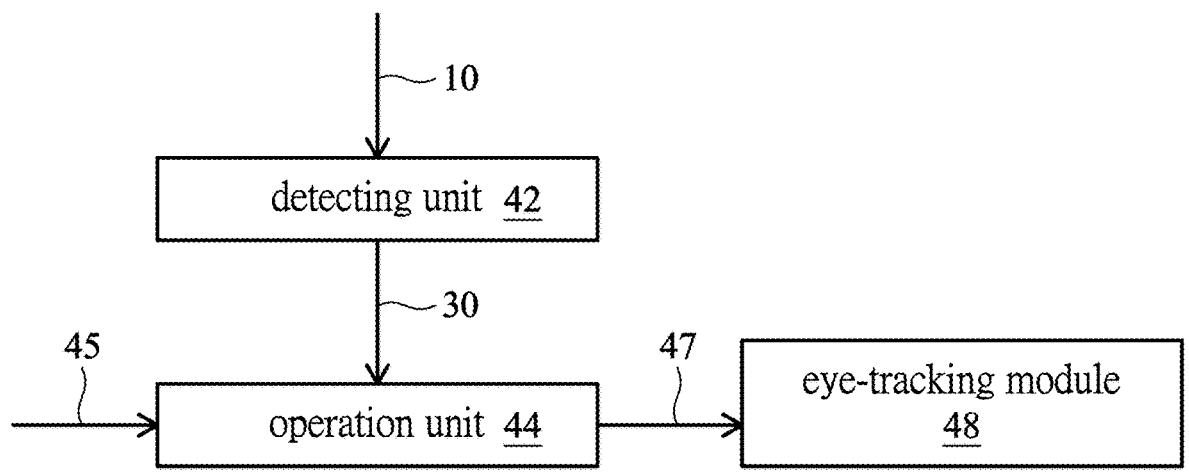
FIG. 4 is a block diagram of a correction module for eye tracking according to an embodiment of the present invention.

FIG. 4 is a block diagram of a correction module for eye-tracking according to an embodiment of the present invention. Referring to FIGS. 1, 3 and 4, the correction module can be implemented in a chip with software and hardware, and mainly includes a detecting unit 42 and an operation unit 44. The detecting unit 42 receives the scene frame 10, analyzes the scene frame 10 by the object detection method, and obtains and outputs a saliency map 30 with a salient feature information to the operation unit 44. The scene frame 10 can be an image captured by the scene camera, an image provided by a computer and captured by the scene camera, or an image that is captured by the scene camera and combined with some further objects provided by the computer. The operation unit 44 performs an error analysis based on the salient feature information or based on the salient feature information and an image information 45 of an eye frame from the eye camera 22, and then a correction data 47 is acquired. The operation unit 44 outputs the correction data 47 to an eye-tracking module 48 for correcting the eye-tracking operation. It will be appreciated that in another embodiment of the present invention the correction module can also be integrated into the eye-tracking module 48, or both the correction module and the eye-tracking module 48 can be integrated into a chip.

Although specific embodiments have been illustrated and described, it will be appreciated by those skilled in the art that various modifications may be made without departing from the scope of the present invention, which is intended to be limited solely by the appended claims.

What is claimed is:

1. A correction method for eye-tracking of an eye tracker, comprising:
receiving an eye frame captured by an eye camera;
providing a scene frame captured by a scene camera;
analyzing the scene frame to obtain a salient feature information of the scene frame; and
correcting an eye-tracking operation based only on the salient feature information if the eye-tracker has never been corrected;
correcting the eye-tracking operation based on the salient feature information and the eye frame if the eye tracker has been corrected before.

2. The correction method as recited in claim 1, wherein the scene frame is captured and provided by the scene camera.

3. The correction method as recited in claim 1, wherein the scene frame is provided by a computer and captured by the scene camera.

4. The correction method as recited in claim 1, wherein the scene frame is captured and provided by the scene camera and the scene frame is further incorporated with one or more object images provided by a computer.

5. The correction method as recited in claim 1, wherein the step of analyzing the scene frame comprises obtaining the salient feature information by a region of interest (ROI) method.

6. The correction method as recited in claim 1, wherein the step of analyzing the scene frame comprises obtaining the salient feature information by a salient object detection method.

7. A correction module implemented in a chip for eye-tracking of an eye-tracker, comprising:
an eye camera for capturing eye frames of a user;
a detecting unit receiving a scene frame;
an operation unit analyzing the scene frame to obtain a salient feature information of the scene frame, receiving an eye frame from the eye camera, computing only the salient feature information to obtain a correction data if the eye-tracker has never been corrected, and computing the salient feature information and the eye frame to obtain the correction data if the eye-tracker has been corrected before.

8. The correction module as recited in claim 7, wherein the scene frame is captured and provided by a scene camera.

9. The correction module as recited in claim 7, wherein the scene frame is an image frame of a video provided by a computer and captured by a scene camera.

10. The correction module as recited in claim 7, wherein the scene frame is captured and provided by a scene camera and the scene frame is further incorporated with one or more object images provided by a computer.

11. The correction module as recited in claim 7, wherein the scene frame is analyzed to obtain the salient feature information by a region of interest (ROI) method.

12. The correction module as recited in claim 7, wherein the scene frame is analyzed to obtain the salient feature information by a salient object detection method.

13. An eye-tracking chip of an eye-tracker, comprising:
a correction module comprising:
an eye camera for capturing eye frames of a user;
a detecting unit receiving a scene frame;
an operation unit analyzing the scene frame to obtain a salient feature information of the scene frame, receiving an eye frame from the eye camera, computing only the salient feature information to obtain a correction data if the eye-tracker has never been corrected, and computing the salient feature information and the eye frame to obtain the correction data if the eye-tracker has been corrected before; and
an eye-tracking module correcting an eye-tracking operation according to the correction data.

* * * * *